E. H. OVERSMITH.
TRACTION CONSTRUCTION.
APPLICATION FILED JUNE 22, 1917.

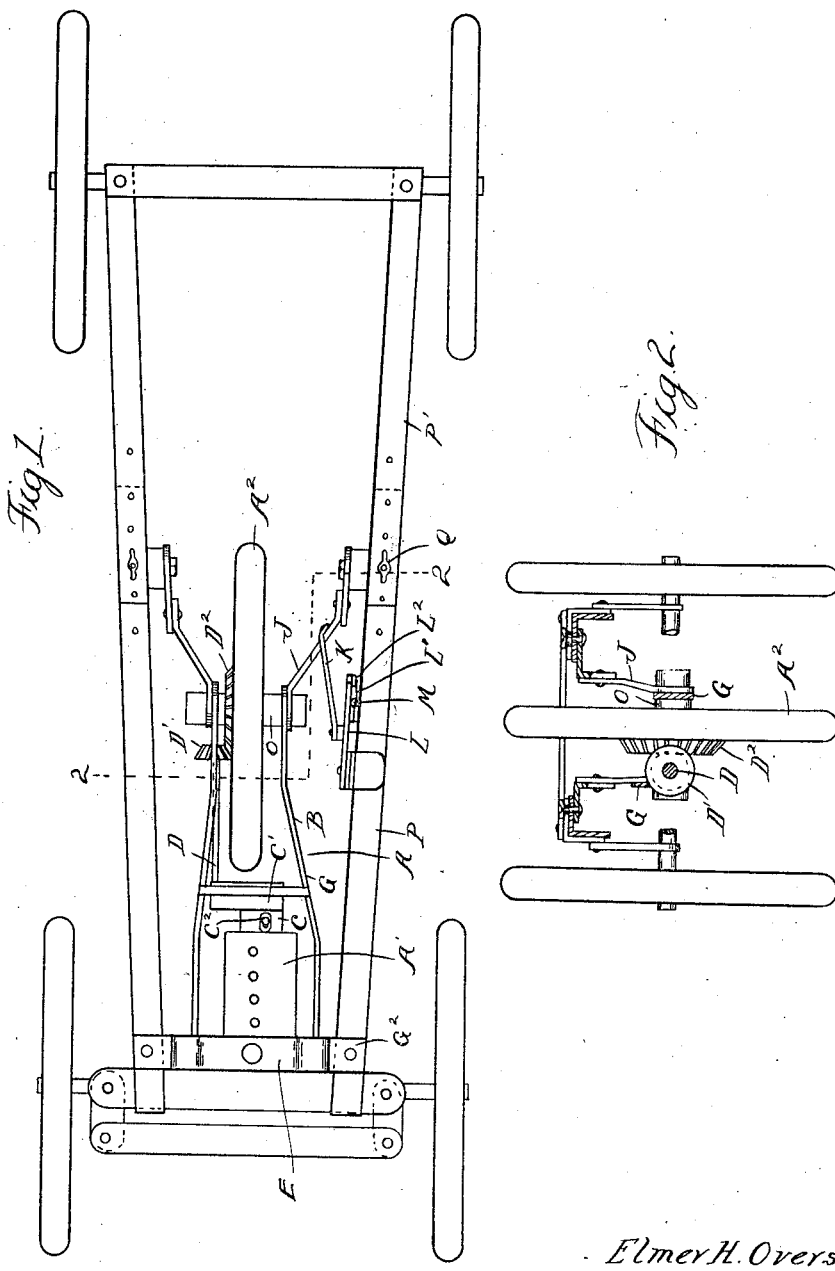

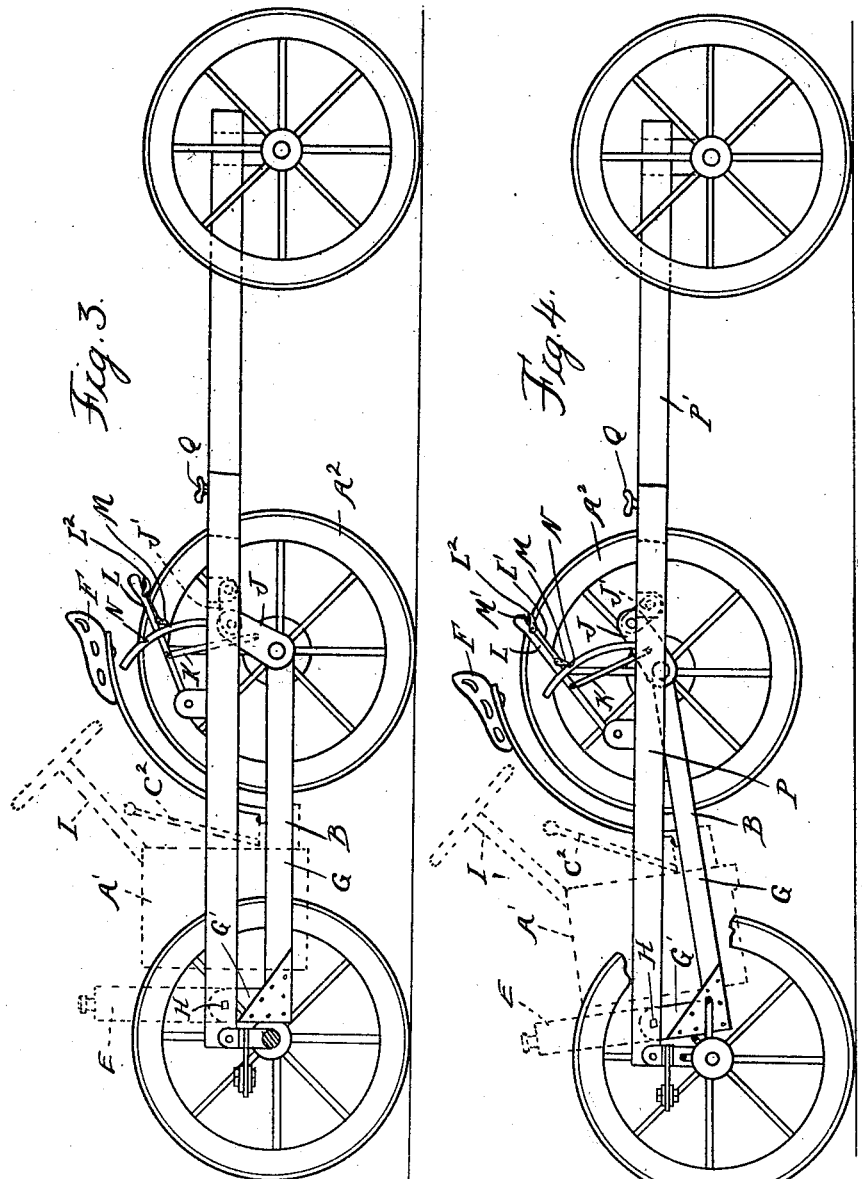

1,284,435.

Patented Nov. 12, 1918.
3 SHEETS—SHEET 3.

Inventor
Elmer H. Oversmith

By Whittemore Hulbert & Whittemore
Attorneys

UNITED STATES PATENT OFFICE.

ELMER H. OVERSMITH, OF JONESVILLE, MICHIGAN, ASSIGNOR, BY DIRECT AND MESNE ASSIGNMENTS, TO THE BUFFALO TRUCK & TRACTOR CORPORATION, OF BUFFALO, NEW YORK, A CORPORATION OF NEW YORK.

TRACTION CONSTRUCTION.

1,284,435.      Specification of Letters Patent.      Patented Nov. 12, 1918.

Application filed June 22, 1917. Serial No. 176,255.

*To all whom it may concern:*

Be it known that I, ELMER H. OVERSMITH, a citizen of the United States of America, residing at Jonesville, in the county of Hillsdale and State of Michigan, have invented certain new and useful Improvements in Traction Constructions, of which the following is a specification, reference being had therein to the accompanying drawings.

The invention relates to a traction construction and one of the objects of the invention is to obtain a construction which is a complete motive unit and may be readily secured to the frames of various vehicles to form a tractor, a truck or a pleasure vehicle.

A further object of the invention is to obtain a construction in which the traction wheel may be raised whereby the motive unit may be used as an individual power plant. Still other objects of the invention reside in the peculiar arrangements of parts more fully hereinafter described.

In the drawings:

Figure 1 is a top plan view of the structure embodying my invention, the steering wheel and the driver's seat being omitted.

Fig. 2 is a cross section on the line 2—2 of Fig. 1;

Fig. 3 is a side elevation, the driver's seat being shown;

Fig. 4 is a fragmentary side elevation showing the traction wheel in raised position;

Figure 5:
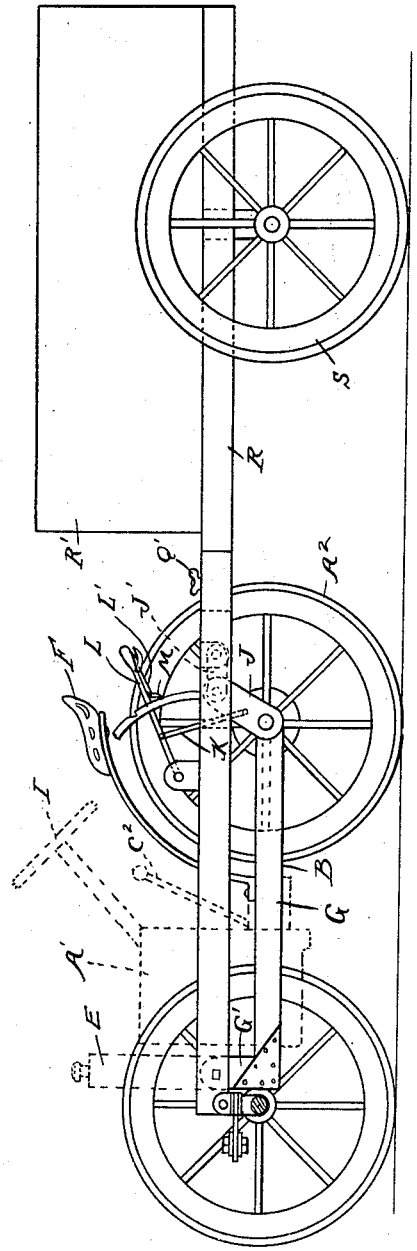
Fig. 5 is a side elevation showing the addition of a frame having a body thereon.
Figure 6:
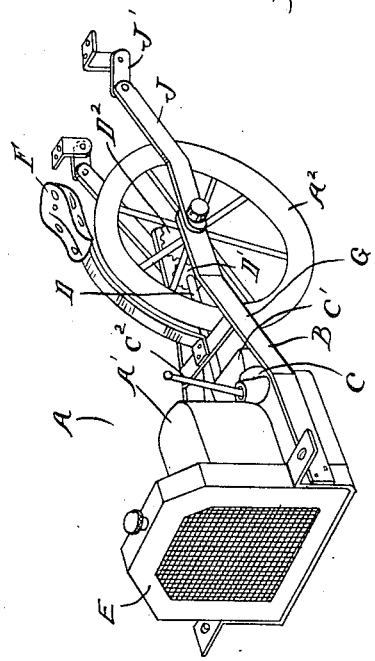
Fig. 6 is a perspective view of the traction unit.

A represents the motive unit comprising the engine A' and the traction wheel $A^2$ mounted upon the frame B, the traction wheel being driven from the engine through the engine clutch C, the transmission C' controlled by the gear shifting lever $C^2$ and the drive shaft D having a beveled pinion D' engaging with the beveled gear $D^2$ connected to the traction wheel. As shown the engine is of the water cooled type and requires the radiator E which is also mounted on the frame B and at the forward end thereof. The driver's seat F is suitably mounted on the frame B in position so that the driver may properly operate the clutch C and the gear shifting lever $C^2$.

The frame B comprises the side bars G, at the rear end of which is mounted the traction wheel $A^2$ and at the forward end of which are rigidly connected the upwardly-extending bars G'. These bars are spaced from each other by means of the cross bar $G^2$ located at the forward end of the frame and the traction wheel $A^2$. The supporting means for the engine and the other mechanism on the frame also assist in maintaining the bars spaced. The upper ends of the upwardly-extending bars G' are provided with apertures engageable with the pivot pins H which pass through the side bars of the vehicle frame to which the motive unit is to be secured. This vehicle may be provided with any desired steering mechanism (not shown) having the hand wheel I extending into proximity and in front of the driver's seat F to be operated by the driver.

For the purpose of raising the traction wheel from the surface upon which it normally rests so that the motive unit may be employed as an individual power plant, the pivot of the traction wheel is pivotally engaged on opposite sides of the wheel by the links J, in turn pivotally connected to the links J' which are pivoted upon the side bars of the vehicle frame and extend substantially horizontal when the traction wheel is in normal position. Pivotally secured to one of the links J intermediate its ends is the rod K pivotally connected to the lever L which is pivoted upon one of the side bars of the vehicle frame and is held in adjusted position by means of the dog M pivotally mounted thereon and engaging the notched segment N on the frame. The dog M is connected by the link L' to the lever $L^2$ pivoted upon the lever L and having a portion adapted to normally lie substantially parallel thereto, the spring M' located between the outer end of the lever L and the substantial parallel portion of the lever $L^2$ yieldably forcing the dog into engagement with the segment. The notch in the segment is located a sufficient distance above the vehicle frame side bar to permit of the normal raising and lowering of the traction wheel in operation.

When the traction wheel $A^2$ is raised to permit of using the motive unit as an individual power plant, power is taken from the traction wheel as by means of a belt running upon the pulley O secured to the traction wheel at its side.

It will be readily seen that a construction is provided having a motive unit which may be readily secured to various frames of vehicles depending upon the particular structure desired.

Another important feature of the present invention is that of making the side bars of the vehicle frame into two separable parts which may be adjustably secured to each other to vary the length of the vehicle frame. As shown each side bar of the vehicle frame comprises the coöperating forward and rearward bars P and P' respectively having a plurality of apertures through which the securing bolt Q extends to secure the bars to each other, the forward bars P having secured thereto the steering mechanism and the front wheels and the rearward bars P' having secured thereto the rear wheels.

With this construction a truck is formed merely by removing the rearward bars P' with the rear wheels and adding the bars R carrying the truck body R' and having the wheels S, as shown in Fig. 5. This construction also permits of changing the vehicle to any other desired type or form.

What I claim as my invention is:

1. A motive unit attachable to the frame of a vehicle intermediate the wheels thereof, comprising a frame, a traction wheel, an engine driving said traction wheel, and a radiator connected to said engine and extending above said vehicle frame, all mounted on said motive unit frame.

2. A motive unit attachable to a vehicle, comprising a frame having its forward end connected to said vehicle, an engine and a traction wheel mounted upon said frame, means for driving said wheel from said engine, including a clutch and transmission gearing, means for controlling said clutch and transmission gearing, and a seat mounted upon said frame and positioned with respect to said controlling means, whereby the driver may operate the latter when in the seat.

3. The combination with a vehicle, of a motive unit attachable thereto, comprising a frame and an engine, a traction wheel, driving connections between said engine and wheel, and a driver's seat all mounted on said last mentioned frame, said seat being positioned so that the driver can control said driving connections, and a hand wheel upon said vehicle for controlling the steering of the same, positioned to be operated by said driver in the seat.

4. The combination with a vehicle, of a motive unit pivotally mounted upon said vehicle and adapted to propel the same, and means for raising the free end of said motive unit relative to said vehicle whereby the same may be used as an individual power plant.

5. The combination with a vehicle, having side bars, of a motive unit attachable to said vehicle, comprising a frame having side bars, an engine upon said frame and a traction wheel mounted at the rear ends of said last mentioned side bars, means for driving said wheel from said engine and a radiator mounted between the forward ends of said last mentioned side bars, said side bars being pivotally connected to the ends of said first mentioned side bars and the radiator extending above said first mentioned side bars.

6. A motive unit attachable to a vehicle, having front and rear axles with wheels rotatably mounted thereon, and a frame supported upon said axles, said unit comprising a frame having its forward end connected to the forward end of said vehicle frame, an engine and a traction wheel mounted upon said frame, means for driving said wheel from said engine including a clutch and transmission gearing, and a seat mounted upon said frame and positioned with respect to said controlling means, whereby the driver may operate the latter when in the seat.

7. The combination with a vehicle frame, of a motive unit, comprising a frame pivotally secured to said vehicle frame, an engine and a traction wheel mounted upon said pivotal frame, the traction wheel adapted to be driven from said engine and actuate the vehicle, links connecting the free end of said motive unit frame to said vehicle frame and links connected to said links for raising the motive unit frame relative to the vehicle frame to a position to permit of free rotation of the traction wheel.

In testimony whereof I affix my signature.

ELMER H. OVERSMITH.

Copies of this patent may be obtained for five cents each, by addressing the "Commissioner of Patents, Washington, D. C."